(12) United States Patent
Hatakeyama

(10) Patent No.: US 9,583,002 B2
(45) Date of Patent: Feb. 28, 2017

(54) VEHICLE INFORMATION TRANSMITTING DEVICE

(75) Inventor: Yoshiyuki Hatakeyama, Fuji (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/365,381

(22) PCT Filed: Dec. 14, 2011

(86) PCT No.: PCT/JP2011/078963
§ 371 (c)(1),
(2), (4) Date: Jun. 13, 2014

(87) PCT Pub. No.: WO2013/088535
PCT Pub. Date: Jun. 20, 2013

(65) Prior Publication Data
US 2015/0002285 A1  Jan. 1, 2015

(51) Int. Cl.
*G01G 1/16* (2006.01)
*G08G 1/16* (2006.01)
(Continued)

(52) U.S. Cl.
CPC ............. *G08G 1/165* (2013.01); *B60K 35/00* (2013.01); *B60Q 9/008* (2013.01); *G08G 1/166* (2013.01); *B60K 2350/1096* (2013.01); *B60K 2350/2008* (2013.01); *B60K 2350/2013* (2013.01); *B60K 2350/2052* (2013.01); *B60K 2350/352* (2013.01); *B60K 2350/965* (2013.01)

(58) Field of Classification Search
CPC ........ G08G 1/165; G08G 1/166; B60Q 9/008; B60R 2300/802; B60R 2300/8093; B60W 50/14; B60W 50/146
See application file for complete search history.

(56) References Cited

U.S. PATENT DOCUMENTS

| 5,457,439 A | 10/1995 | Kuhn |
| 2004/0046647 A1* | 3/2004 | Reeves ................. B60Q 9/006 340/435 |

(Continued)

FOREIGN PATENT DOCUMENTS

| DE | 102005051049 A1 | 5/2006 |
| JP | 2003-291688 A | 10/2003 |

(Continued)

*Primary Examiner* — Hongmin Fan
(74) *Attorney, Agent, or Firm* — Andrews Kurth Kenyon LLP

(57) ABSTRACT

To provide a vehicle information transmitting device capable of transmitting information associated with danger at a periphery of the own vehicle in a manner intuitively understandable by the driver. In the present embodiment, when a dangerous direction is the left or the right, a display position of an own vehicle state display figure is changed from a display position in an initial state to a display position on the same side as the dangerous direction. If the dangerous direction is on the front, the display position of the own vehicle state display figure is changed from the display position in the initial state to a display position on an upper side. When a dangerous target is detected, a display area of the own vehicle state display figure is changed to a display area greater than the display area in the initial state.

5 Claims, 15 Drawing Sheets

(51) Int. Cl.
   *B60K 35/00*   (2006.01)
   *B60Q 9/00*   (2006.01)

(56) References Cited

U.S. PATENT DOCUMENTS

| | | | |
|---|---|---|---|
| 2006/0087416 A1 | 4/2006 | Kumabe et al. | |
| 2007/0106475 A1 | 5/2007 | Kondoh | |
| 2010/0283591 A1* | 11/2010 | Schick | 340/436 |
| 2010/0305814 A1 | 12/2010 | Ichikawa | |

FOREIGN PATENT DOCUMENTS

| | | |
|---|---|---|
| JP | 2006-171950 A | 6/2006 |
| JP | 2006-224700 A | 8/2006 |
| JP | 2009-120014 A | 6/2009 |
| JP | 2011-008769 A | 1/2011 |

\* cited by examiner

FIG.10
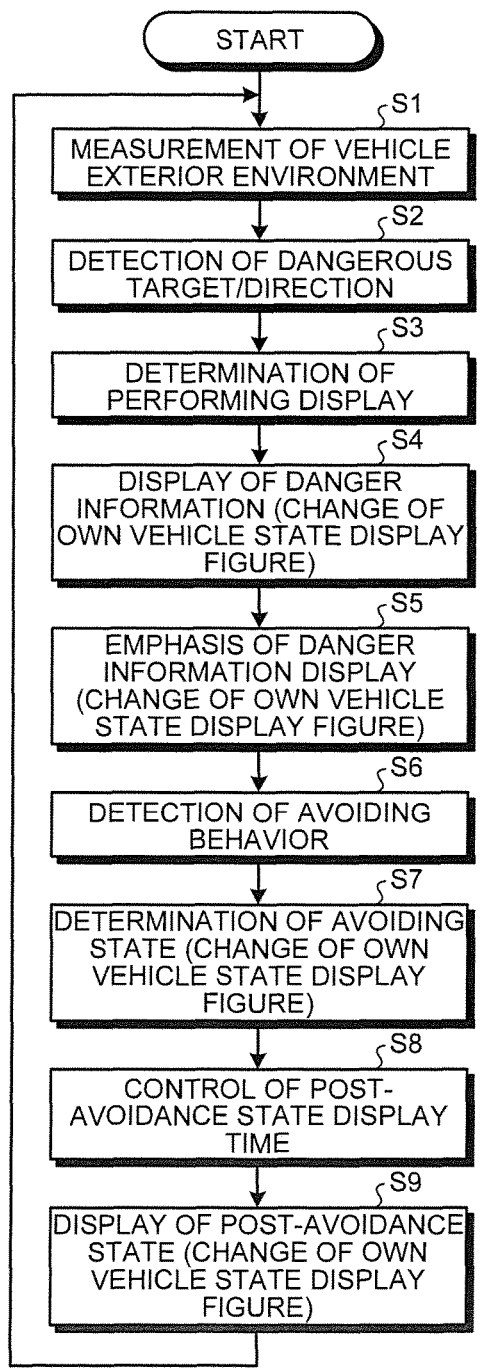
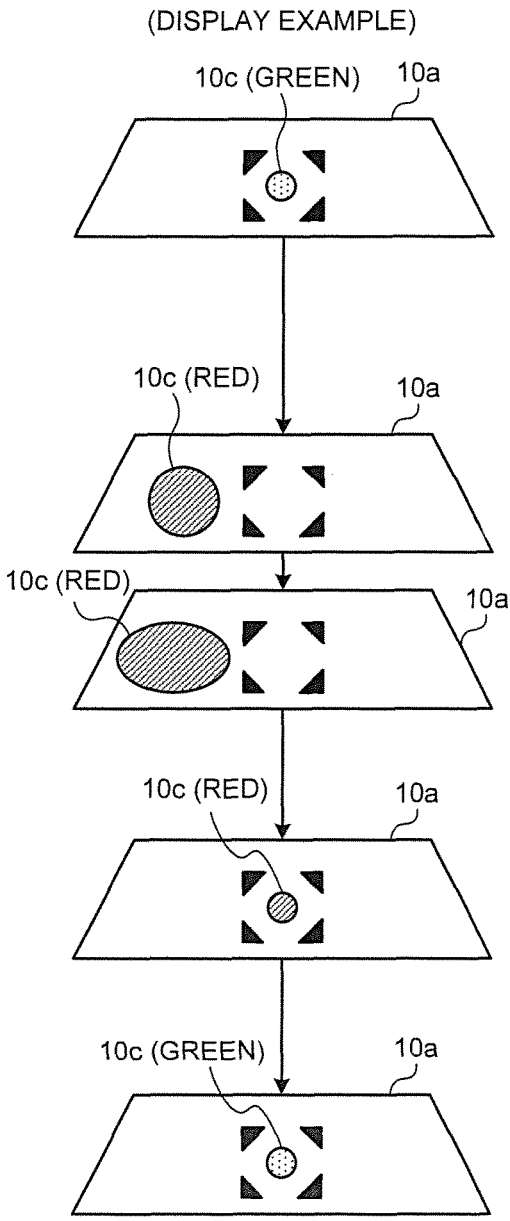

VEHICLE INFORMATION TRANSMITTING DEVICE

CROSS-REFERENCE TO RELATED APPLICATIONS

This is a national phase application based on the PCT International Patent Application No. PCT/JP2011/078963 filed on Dec. 14, 2011, the entire contents of which are incorporated herein by reference.

FIELD

The present invention relates to a vehicle information transmitting device.

BACKGROUND

Patent literature 1 discloses a display control device for calculating a recommended course for avoiding obstacles, and displaying a recommended course line so as to overlap the recommended course on a head-up display.

Other prior art literatures include patent literature 2 and patent literature 3. Patent literature 2 discloses a driving diagnosis device for diagnosing the driving of the driver using a travelling history. Patent literature 3 discloses a vehicle dead angle monitoring device for displaying a warning that an obstacle exists in a dead angle region in a vicinity of a position on a visual line of the driver on a wind shield.

CITATION LIST

Patent Literature

Patent Literature 1: Japanese Patent Application Laid-open No. 2006-171950
Patent Literature 2: Japanese Patent Application Laid-open No. 2011-8769
Patent Literature 3: Japanese Patent Application Laid-open No. 2006-224700

SUMMARY

Technical Problem

However, according to patent literatures 1 and 2, improvement still can be made to transmit, in an easily understandable manner, information (e.g., presence or absence of danger, etc.) associated with the danger at the periphery of the own vehicle without giving a sense of discomfort to the driver.

In light of the foregoing, it is an object of the present invention to provide a vehicle information transmitting device capable of transmitting, in a manner intuitively understandable by the driver, the information associated with the danger at the periphery of the own vehicle.

Solution to Problem

In order to achieve the above mentioned object, a vehicle information transmitting device according to the present invention includes a reference mark display means configured to display a reference mark which is a reference indicating a safe state; and a danger display means configured to display presence or absence of danger to an own vehicle with a relative position with respect to the reference mark. Here, it might be configured that at the time danger is present, the danger display means displays a direction in which the danger is present with a relative position with respect to the reference mark. Further, it might be configured to include an avoiding behavior detecting means configured to detect presence or absence of an avoiding behavior corresponding to the danger, at the time the danger is present, wherein the danger display means displays the presence of the avoiding behavior at a display position of the reference mark, at the time the avoiding behavior detecting means detects that the avoiding behavior is present. Further, it might be configured that the danger display means emphasizes the display that the danger is present, at the time the avoiding behavior detecting means detects that the avoiding behavior is absent. Further, it might be configured that the danger display means differentiates the display that the avoiding behavior is present according to presence or absence of another danger different from the danger.

Advantageous Effects of Invention

The present invention has an effect in that the information associated with the danger at the periphery of the own vehicle can be transmitted in a manner intuitively understandable by the driver since a reference mark, which becomes a reference indicating a safe state, is displayed and the presence or absence of danger with respect to the own vehicle is displayed at a relative position with reference to the reference mark.

BRIEF DESCRIPTION OF DRAWINGS

FIG. 10 is a flowchart illustrating one example of a main process executed by the vehicle information transmitting system according to the present embodiment.

DESCRIPTION OF EMBODIMENTS

An embodiment of a vehicle information transmitting system including a vehicle information transmitting device according to the present invention will be hereinafter described in detail based on the drawings. The present invention is not to be limited by the present embodiment.

1. Configuration Example

Figure 1:
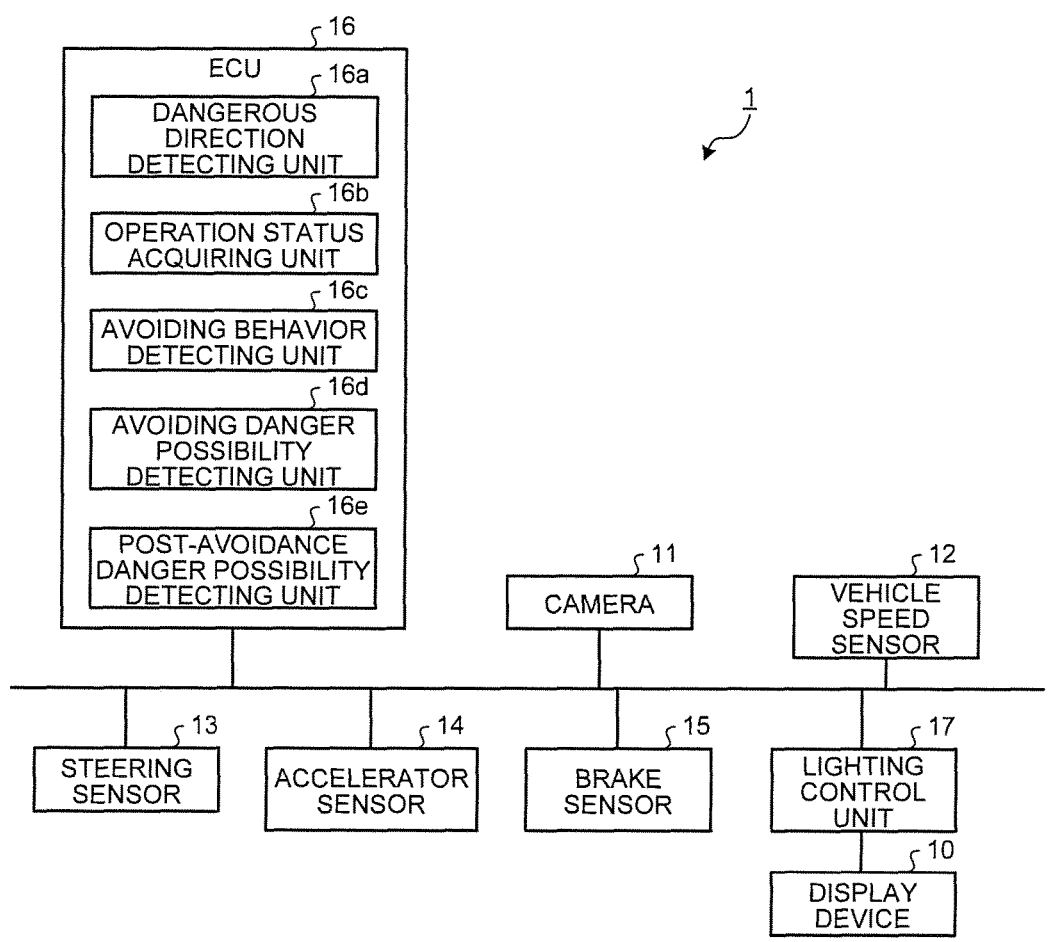
FIG. 1 is a block diagram illustrating one example of a configuration of a vehicle information transmitting system according to the present embodiment.

One example of a configuration of the vehicle information transmitting system according to the present embodiment will be described with reference to FIG. 1 to FIG. 9. FIG. 1 is a block diagram illustrating one example of the configuration of the vehicle information transmitting system according to the present embodiment.

A vehicle 1 includes a display device 10 such as a light indicator, and the like, a camera 11, a vehicle speed sensor 12, a steering sensor 13, an accelerator sensor 14, a brake sensor 15, an ECU (Electronic Control Unit) 16, and a lighting control unit 17. The ECU 16 includes a dangerous direction detecting unit 16a, an operation status acquiring unit 16b, an avoiding behavior detecting unit 16c, an avoiding danger possibility detecting unit 16d, and a post-avoidance danger possibility detecting unit 16e.

The display device 10 is a device to notify the driver of an effective avoiding behavior with respect to a dangerous target in a manner the driver does not feel botheration, and includes a display screen 10a configured by a liquid crystal panel, a plurality of full-color LEDs (Light-Emitting Diode), or the like. In the display screen 10a, a safe region frame 10b indicating that the vehicle 1 is in a state having a relatively low possibility of colliding with the dangerous target in the periphery and an own vehicle state display FIG. 10c indicating the state (safe status) of the vehicle 1 is displayed.

Figure 2:
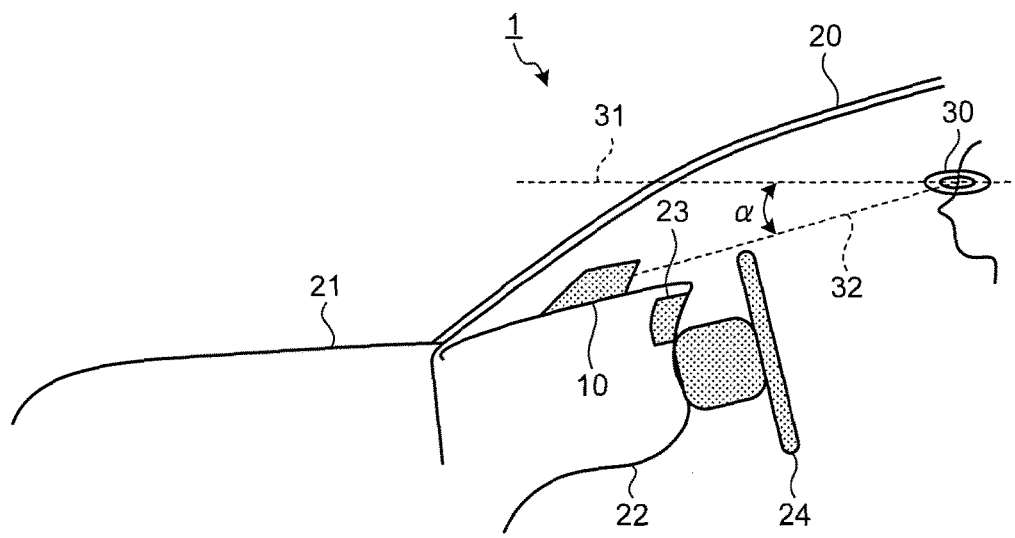
FIG. 2 is a view illustrating one example of a mounting position of a display device 10.

FIG. 2 is a view illustrating one example of a mounting position of the display device 10. In FIG. 2, reference number 20 refers to a front window glass, reference number 21 refers to a hood, reference number 22 refers to an instrument panel, reference number 23 refers to a meter panel, reference number 24 refers to a steering wheel (handle), reference number 30 refers to an eye point of the driver, reference number 31 refers to a visual line (center view) of the driver at the time of normal driving, and reference number 32 refers to a visual line (peripheral view) of the driver for viewing the display device 10. The display device 10 is installed on the instrument panel 22, and is installed in a range of the peripheral view of the driver (e.g., position where the driver can recognize the display device 10 at the lowermost layer (e.g., depression angle α from the line of the reference number 31 of smaller than or equal to five degrees) of the peripheral view of the driver) in a manner the driver does not feel botheration. The display device 10 is, for example, installed at a position substantially in front of the driver in the instrument panel 22. The eye point 30 is a point at the height of 635 (mm) toward a perpendicularly upper side of a seating reference point, which is a hip joint point of a human phantom when the human phantom is seated on a seat based on ISO6549-1980 (see "DETERMINE THE DETAILS OF SAFETY STANDARDS FOR ROAD TRUCK VEHICLE" disclosed on the homepage address "http://www.mlit.go.jp/jidosha/kijyun/saimokubetten/saibet_081_00.pdf" notice [2005.11.09] (technical standards just before direct checked mirror) see attachment 81).

Returning back to FIG. 1, the camera 11 measures the state of the vehicle exterior environment of the vehicle 1 (specifically, state of the periphery on the front side of the vehicle 1 including the vicinity of the course of the vehicle 1 where the dangerous target (e.g., pedestrian, bicycles, other vehicles, etc.) that may become the cause of accidental contact with the vehicle 1 has a possibility of existing). For example, a radar, and the like may be used instead of the camera. The vehicle speed sensor 12 detects the vehicle speed of the vehicle 1. The steering sensor 13 detects the steering direction of the steering wheel 24 of the vehicle 1. The accelerator sensor 14 detects ON/OFF of an acceleration pedal of the vehicle 1. The brake sensor 15 detects ON/OFF of a brake pedal of the vehicle 1.

The dangerous direction detecting unit 16a detects the presence or absence of the dangerous target and the existing direction (dangerous direction) of the dangerous target having the position or the advancing direction of the vehicle 1 as a reference from the image obtained with the camera 11. Specifically, if the dangerous target exists, the dangerous direction detecting unit 16a detects whether the dangerous target exists on the left, the front, or the right with respect to the position or the advancing direction of the vehicle 1.

The operation status acquiring unit 16b acquires information associated with the operation status of a safe drive supporting device (e.g., engine failure warning lamp, brake hydraulic pressure warning lamp, antiskid system operation display, etc.) other than the display device 10 mounted on the vehicle 1.

The avoiding behavior detecting unit 16c detects (determines) whether or not the driver took an appropriate (recommended) avoiding behavior with respect to the dangerous target detected by the dangerous direction detecting unit 16a based on the detection result of the steering sensor 13, the detection result of the accelerator sensor 14, the detection result of the brake sensor 15, and the like. Specifically, if the dangerous direction detected by the dangerous direction detecting unit 16a is on the left or the right, the recommended avoiding behavior is to move the vehicle 1 away from the detected dangerous target, and thus the avoiding behavior detecting unit 16c detects whether the steering wheel 24 is turned opposite to the dangerous direction (specifically, right if the dangerous direction is on the left, and left if the dangerous direction is on the right) within a predetermined time (e.g., two seconds, etc.) from when the display mode of the own vehicle state display FIG. 10c is switched to the danger information display state. If the dangerous direction detected by the dangerous direction detecting unit 16a is at the front, the recommended avoiding behavior is to ensure a great amount of time until approaching the detected dangerous target, and thus the avoiding behavior detecting unit 16c detects whether or not the acceleration is turned OFF or the brake is turned ON within a predetermined time (e.g., two seconds, etc.) from when the display state of the own vehicle state display FIG. 10c is switched to the danger information display state. In the present embodiment, the type (specifically, steering wheel, acceleration pedal, and brake pedal) of the device operated to take the avoiding behavior and the operation methods thereof (specifically, steering of the steering wheel to a direction opposite to the dangerous direction, turning OFF of the acceleration pedal and turning ON of the brake pedal) are defined, and the operation amounts of the device (specifically, steering amount of the steering wheel, return amount of the acceleration pedal, and depression amount of the brake pedal) are not defined. Thus, the performance of the detection of the avoiding behaviour that does not depend on the driving technique can be guaranteed (however, detection of the dangerous direction is assumed to be performed around five seconds before contact of the vehicle 1 and the dangerous target).

The avoiding danger possibility detecting unit 16d corresponds to an avoiding behavior detecting means of the present invention. The avoiding danger possibility detecting unit 16d detects whether or not another dangerous target, which is different from the currently avoiding dangerous target (avoiding target) detected by the dangerous direction detecting unit 16a and which has a possibility of changing to be dangerous in the future, exists in a forward range of the vehicle 1 (e.g., range from the current position of the vehicle 1 to the existing position of the vehicle 1 after a predetermined time (e.g., four seconds etc.) from the current time point) based on the image obtained with the camera 11.

The post-avoidance danger possibility detecting unit 16e detects whether or not the dangerous target having the possibility of changing to be dangerous in the future exists in the forward range of the vehicle 1 (e.g., range from the current position of the vehicle 1 to the existing position of the vehicle 1 after a predetermined time (e.g., three seconds etc.) from the current time point)) based on the image obtained with the camera 11.

The lighting control unit 17 corresponds to a reference mark display means and a danger display means of the present invention. The lighting control unit 17 controls the display state of the safe region frame 10b and the own vehicle state display FIG. 10c based on the detection result of the dangerous direction detecting unit 16a, the acquisition result of the operation status acquiring unit 16b, the detection result of the avoiding behavior detecting unit 16c, the detection result of the avoiding danger possibility detecting unit 16d, the detection result of the post-avoidance danger possibility detecting unit 16e, and the like. The lighting control unit 17 may adjust the luminance of light with ON/OFF of the head-light, the con-light sensor, and the like. For example, the lighting control unit 17 may lower the luminance of the light at night.

Figure 3:
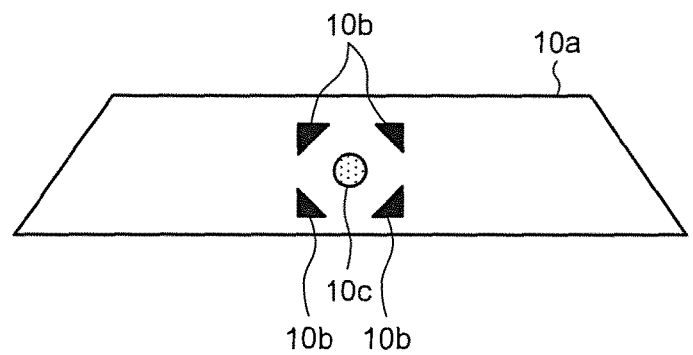
FIG. 3 is a view illustrating one example of a display screen 10a in an initial state.

FIG. 3 is a view illustrating one example of the display screen 10a in an initial state. The lighting control unit 17 displays the safe region frame 10b in the vicinity of the center of the display screen 10a. The lighting control unit 17 displays the own vehicle state display FIG. 10c in the vicinity of the center of the safe region frame 10b. The display shape of the safe region frame 10b may be a shape in which the four sides of the square are recognizable, for example, other than the shape illustrated in FIG. 3 in which the vicinity of the four corners of the square is recognizable. The display shape of the safe region frame 10b may be a shape based on a polygon, circle, ellipse, or the like, for example, other than the shape illustrated in FIG. 3 based on a square. The display color of the safe region frame 10b may be a color the driver does not feel botheration, and the display color of the own vehicle state display FIG. 10c may be a color that stands out more than the safe region frame 10b. The display shape of the own vehicle state display FIG. 10c may be a polygon, an ellipse, or the like, for example, other than a circle illustrated in FIG. 3. Furthermore, in the initial state, the display area of the own vehicle state display FIG. 10c may be a small area of an extent illustrated in FIG. 3 so as to be entirely fitted in the safe region frame 10b with a margin. The display color of the own vehicle state display FIG. 10c may be green in the initial state and may be red in the danger information display state.

Figure 4:
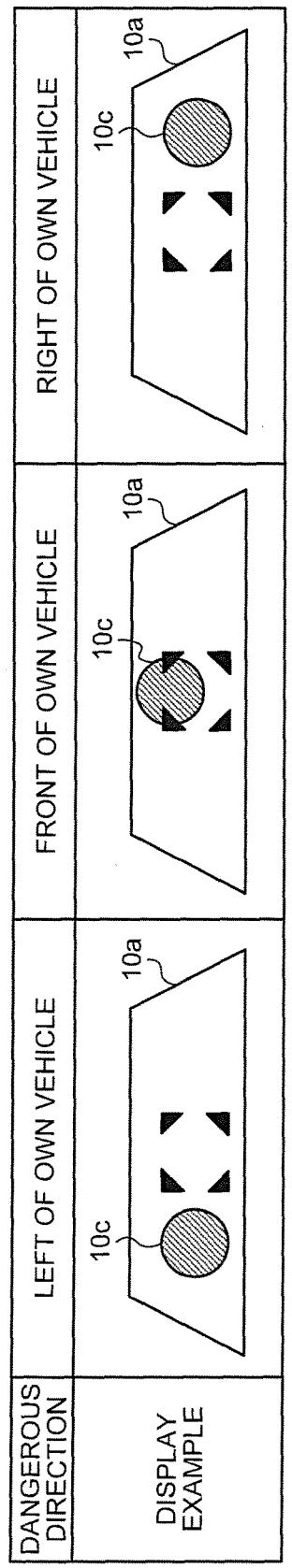
FIG. 4 is a view illustrating a changing example of a display mode of an own vehicle state display FIG. 10c.

FIG. 4 is a view illustrating a changing example of the display state of the own vehicle state display FIG. 10c. If the dangerous target is detected by the dangerous direction detecting unit 16a, the lighting control unit 17 changes step-wisely or gradually, for example, the display state of the own vehicle state display FIG. 10c from the initial state to the danger information display state to notify the driver of the effective avoiding behavior without giving the driver a sense of botheration. Specifically, if the dangerous direction detected by the dangerous direction detecting unit 16a is left or right, the lighting control unit 17 changes the display position of the own vehicle state display FIG. 10c from the display position in the initial state to the display position on the side same as the relevant dangerous direction (specifically, left side if the dangerous direction is on the left and right side if the dangerous direction is on the right) and on the outer side of the safe region frame 10b. If the dangerous direction detested by the dangerous direction detecting unit 16a is at the front, the lighting control unit 17 changes the display position of the own vehicle state display FIG. 10c from the display position in the initial state to the display position on the upper side where the dangerous direction can be easily recognized by the driver. Furthermore, if the dangerous target is detected by the dangerous direction detecting unit 16a, the lighting control unit 17 changes the display area of the own vehicle state display FIG. 10c from the display area in the initial state to the display area having a size of an extent illustrated in FIG. 4 of being entirely fitted in the safe region frame 10b. If the dangerous target is detected by the dangerous direction detecting unit 16a, the lighting control unit 17 changes the display color of the own vehicle state display FIG. 10c from the display color in the initial state (e.g., green, etc.) to the display color of the danger information display state (e.g., red, etc.).

Figure 5:
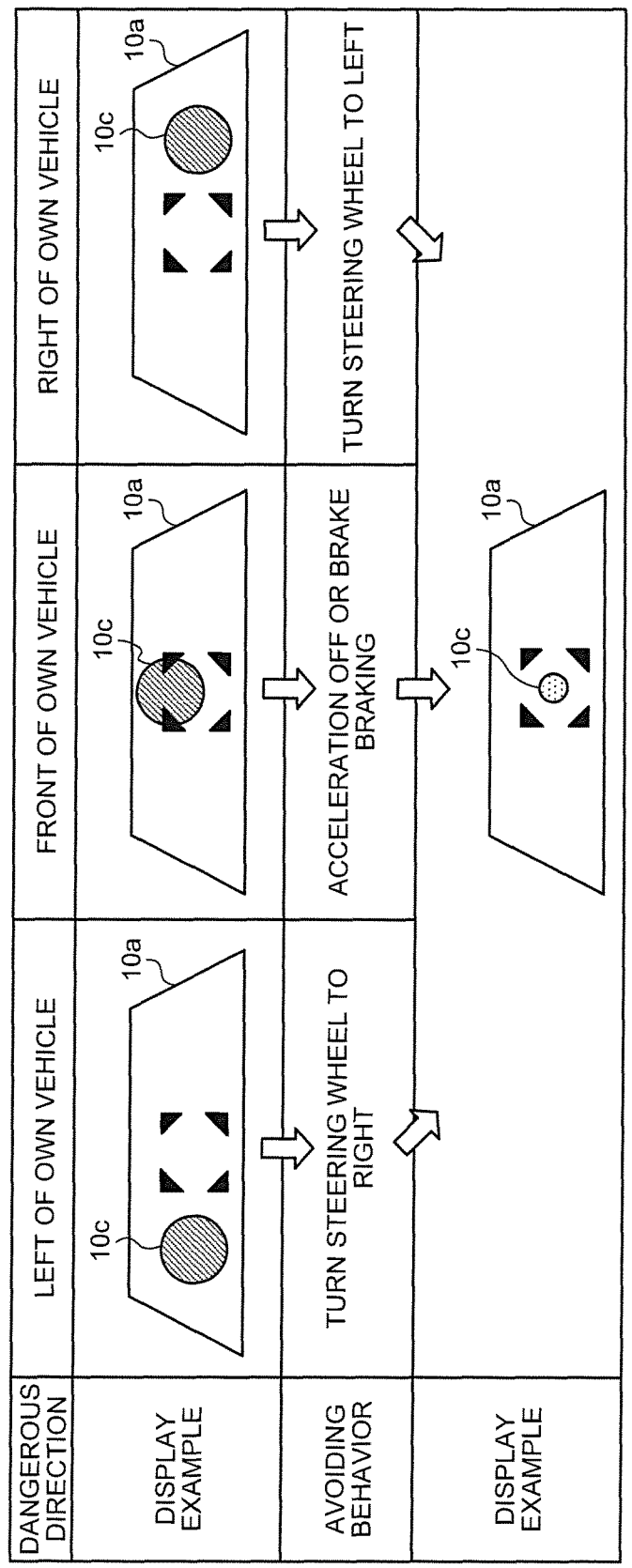
FIG. 5 is a view illustrating a changing example of the display mode of the own vehicle state display FIG. 10c.

FIG. 5 is a view illustrating a changing example of the display mode of the own vehicle state display FIG. 10c. When the display state of the own vehicle state display FIG. 10c is in the danger information display state, the lighting control unit 17 changes (transitions) step-wisely or gradually, for example, the display state of the own vehicle state display FIG. 10c from the danger information display state to the initial state (safe information display state) if detected that the driver took an appropriate avoiding behavior by the avoiding behavior detecting unit 16c. Conventionally, there is a divergence between the subjective view of the driver that "safe state is obtained by taking the avoiding behavior" and the display content of "dangerous target is present" since the display content is not changed even if the avoiding behavior is taken, and thus the driver sometimes feels a sense of discomfort or botheration. In the present embodiment, however, the drive assist that accords with the feeling of the driver and gives satisfaction to the driver can be provided by resolving such divergence.

Figure 6:
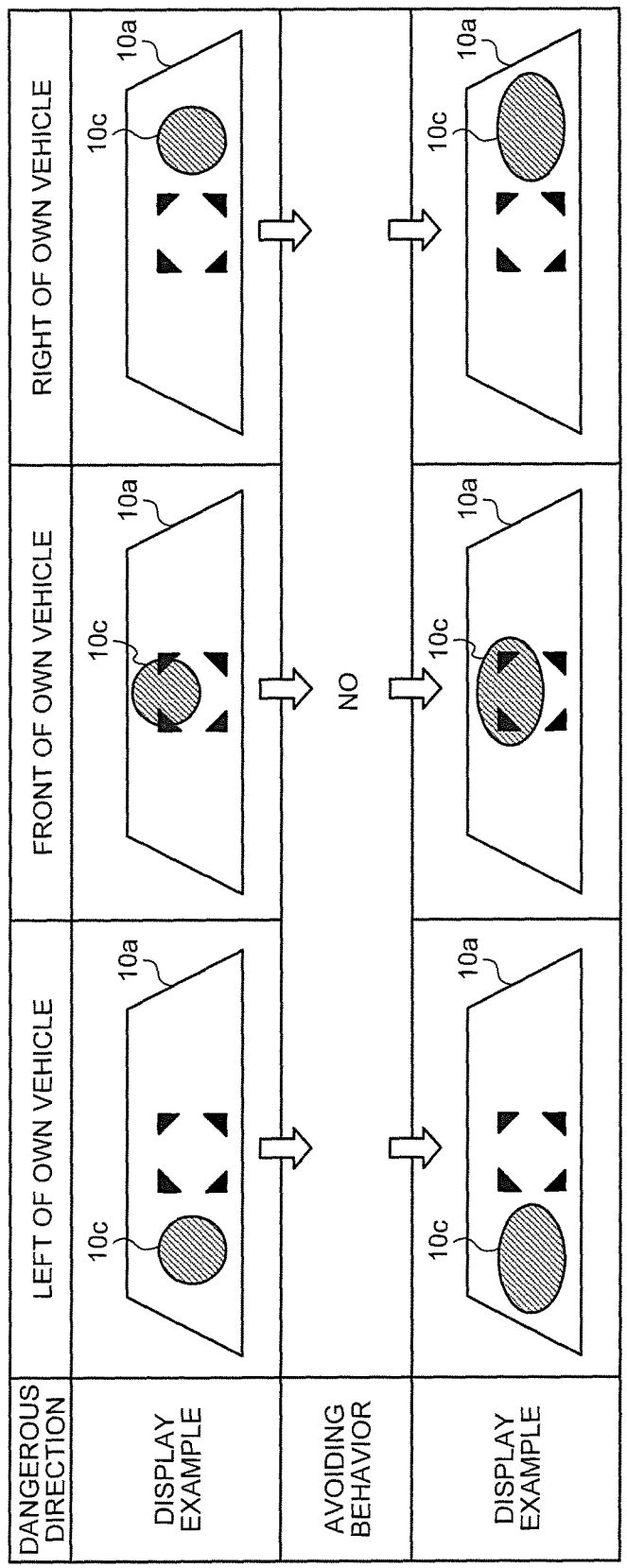
FIG. 6 is a view illustrating a changing example of the display mode of the own vehicle state display FIG. 10c.

FIG. 6 is a view illustrating a changing example of the display mode of the own vehicle state display FIG. 10c. When the display state of the own vehicle state display FIG. 10c is in the danger information display state, the lighting control unit 17 changes (completes the change of) the display state of the own vehicle state display FIG. 10c from the danger information display state to the danger information emphasis display state within a predetermined time (e.g., 0.5 seconds) to notify the driver of the necessity of avoiding behavior if not detected by the avoiding behavior detecting unit 16c that the driver took the appropriate avoiding behavior. Specifically, the lighting control unit 17 changes (increases) the display area of the own vehicle state display FIG. 10c to a display area greater than the display area of the danger information display state. The lighting control unit 17 also changes (deforms) the display shape of the own vehicle state display FIG. 10c to a display shape (e.g., ellipse, etc.) different from the display shape (e.g., circle, etc.) of the danger information display state. Conventionally, since the avoiding behavior and the display content are not relevant, the driver cannot gain the opportunity to correct the avoiding behavior even if the avoiding behavior being performed is wrong. In the present embodiment, however, the driver is able to select the correct avoiding behavior.

Figure 7:
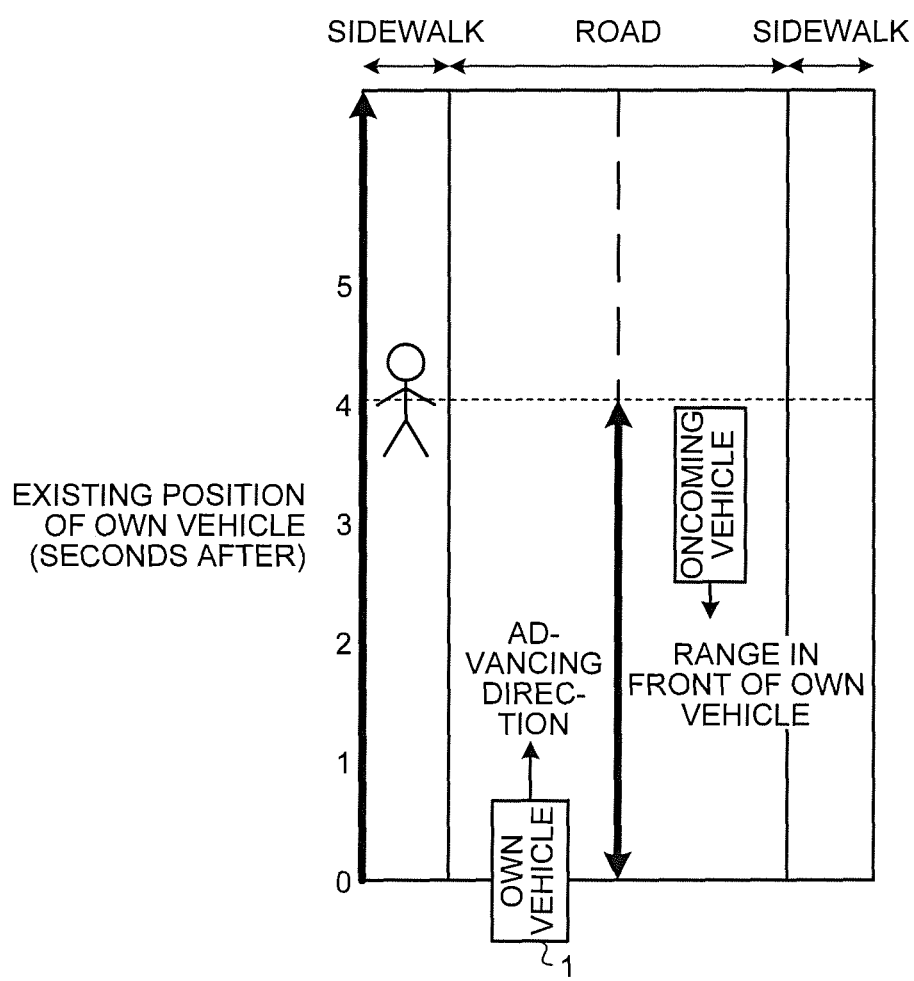
FIG. 7 is a view illustrating one example of a traffic scene.
Figure 8:
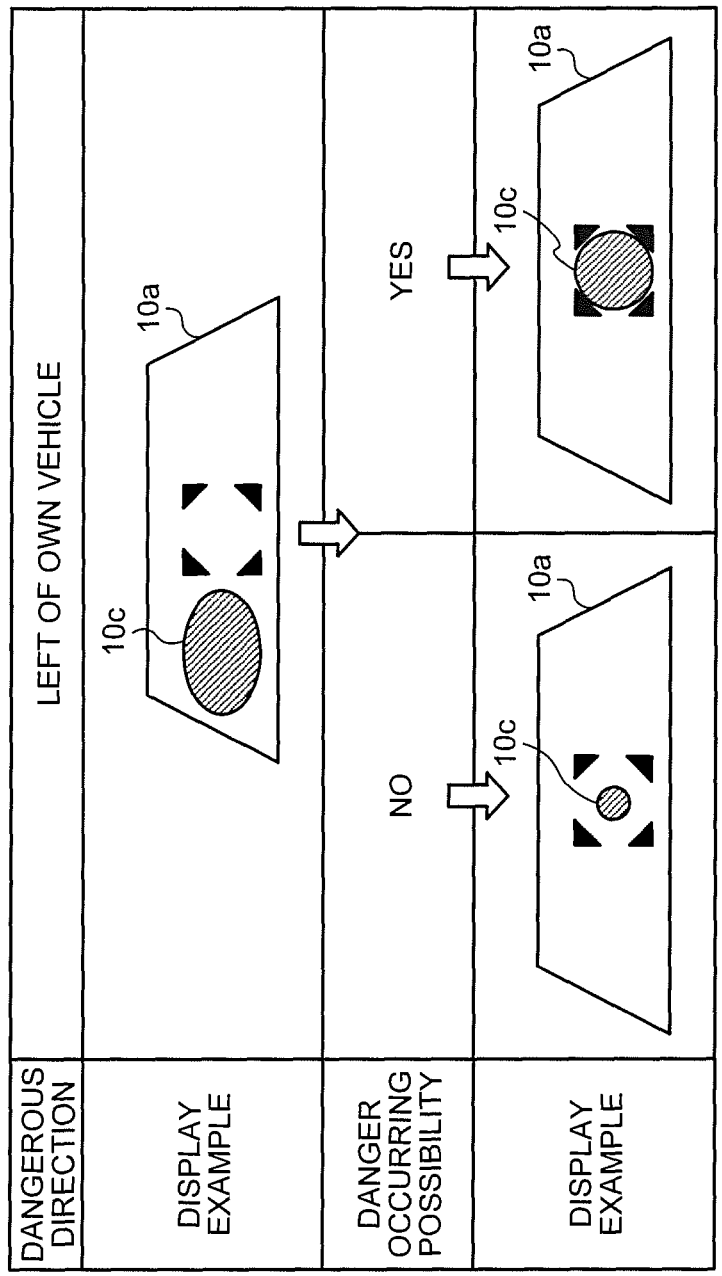
FIG. 8 is a view illustrating a changing example of the display mode of the own vehicle state display FIG. 10c.

FIG. 7 is a view illustrating one example of a traffic scene. FIG. 8 is a view illustrating a changing example of the display state of the own vehicle state display FIG. 10c. When the display state of the own vehicle state display FIG. 10c is in the danger information emphasis display state, the lighting control unit 17 changes the display state of the own vehicle state display FIG. 10c from the danger information emphasis display state to a best information display state according to the detection result of the avoiding danger possibility detecting unit 16d to notify the driver that the avoiding behavior taken is the best if detected by the avoiding behavior detecting unit 16c that the driver took the appropriate avoiding behavior. Specifically, the lighting control unit 17 changes the display position of the own vehicle state display FIG. 10c to the display position in the initial state. The lighting control unit 17 also changes (reduces) the display area of the own vehicle state display FIG. 10c to the display area (e.g., display area of the danger information display state) smaller than the display area of the danger information emphasis display state if another dangerous target is detected by the avoiding danger possibility detecting unit 16d, and changes (reduces) to the display area (e.g., display area in the initial state) smaller than the small display area if another dangerous target is not detected by the avoiding danger possibility detecting unit 16d. The display color of the own vehicle state display FIG. 10c in the best information display state is maintained in the display color (e.g., red, etc.) of the danger information emphasis display state (i.e., danger information display state) since the vehicle 1 has not passed the dangerous target detected by the dangerous direction detecting unit 16a and the driver is in the middle of avoiding the dangerous target. The avoiding behavior with respect to a specific dangerous target is subjected to the influence of other targets other than the specific dangerous target in a traffic environment where various targets coexist, and thus may not be smoothly performed. Conventionally, the reason the avoiding behavior cannot be satisfactorily carried out cannot be specified, and thus the avoiding behavior may be determined as incorrect even if the driver takes the avoiding behavior, which may give the driver a sense of discomfort. In the present embodiment, however, the drive support that gives satisfaction to the driver can be provided by notifying the driver that the avoiding behavior the driver took is the best in the actual traffic environment where the avoiding behavior that can be taken is limited.

Figure 9:
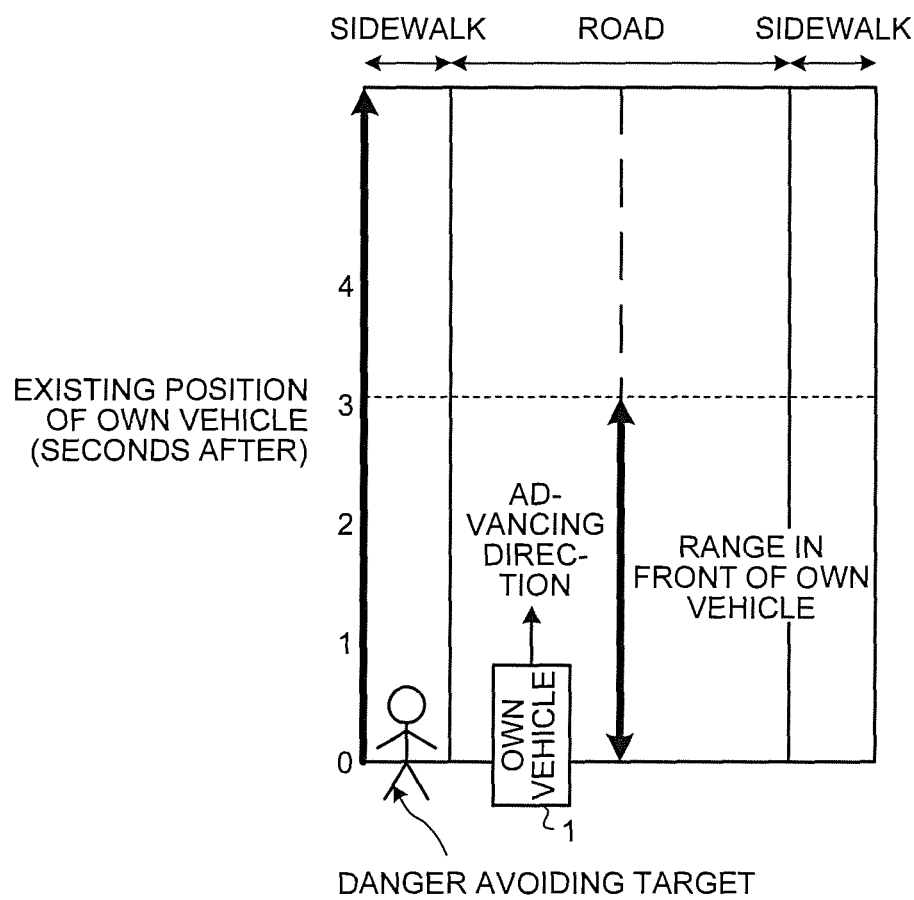
FIG. 9 is a view illustrating one example of the traffic scene.

FIG. 9 is a view illustrating one example of the traffic scene. When the vehicle 1 has passed the dangerous target (avoiding target) detected by the dangerous direction detecting unit 16a and the driver has finished avoiding the relevant dangerous target, the lighting control unit 17 sets a timing (standby time) to change the display state of the own vehicle state display FIG. 10c to the post-avoidance information display state according to the detection result of the post-avoidance danger possibility detecting unit 16e to notify the driver of the information of the avoidance result at the time point the driver can understand. The timing is set to the time point (e.g., four to six seconds), which is three seconds beyond the time point the vehicle 1 passed the side of the dangerous target (avoiding target) detected by the dangerous direction detecting unit 16a when the dangerous target is detected by the post-avoidance danger possibility detecting unit 16e, and set to the time point (e.g., one to three seconds), which is within three seconds from the time point the vehicle 1 passed the side of the avoiding target when the dangerous target is not detected by the post-avoidance danger possibility detecting unit 16e. The lighting control unit 17 changes the display state of the own vehicle state display FIG. 10c to the best information display state corresponding to the post-avoidance information display state at the set timing. Conventionally, the driver is notified of the validity of the avoiding behavior after the memory of the driver associated with the traffic status (traffic scene) at the time point the avoiding behavior was taken has become vague, and thus the avoiding behavior and the response of the traffic status become unclear to the driver and the avoiding behavior is inhibited from becoming a habit. In the present embodiment, however, the driver can be notified of the validity of the avoiding behavior at the stage the memory of the driver associated with the traffic status is clear, and as a result, the avoiding behavior can easily become a habit.

When the operation status that the safe drive supporting device is operating is acquired by the operation status acquiring unit 16b, the lighting control unit 17 turns OFF the own vehicle state display FIG. 10c. The driver is thus able to quickly notice the status of the other safe drive supporting devices other than the display device 10 having a high priority in terms of maintaining safe driving, and as a result, the driver can smoothly transition to the safe state of the own vehicle.

2. Processing Example

One example of a main process executed by the vehicle information transmitting system according to the present embodiment will be described with reference to FIG. 10 to FIG. 17. FIG. 10 is a flowchart illustrating one example of the main process executed by the vehicle information transmitting system according to the present embodiment. In the present explanation, the safe region frame 10b and the own vehicle state display FIG. 10c in the initial state (safe state) are assumed to be displayed in advance in the display screen 10a.

[Step S1: Measurement of Vehicle Exterior Environment]

Figure 11:
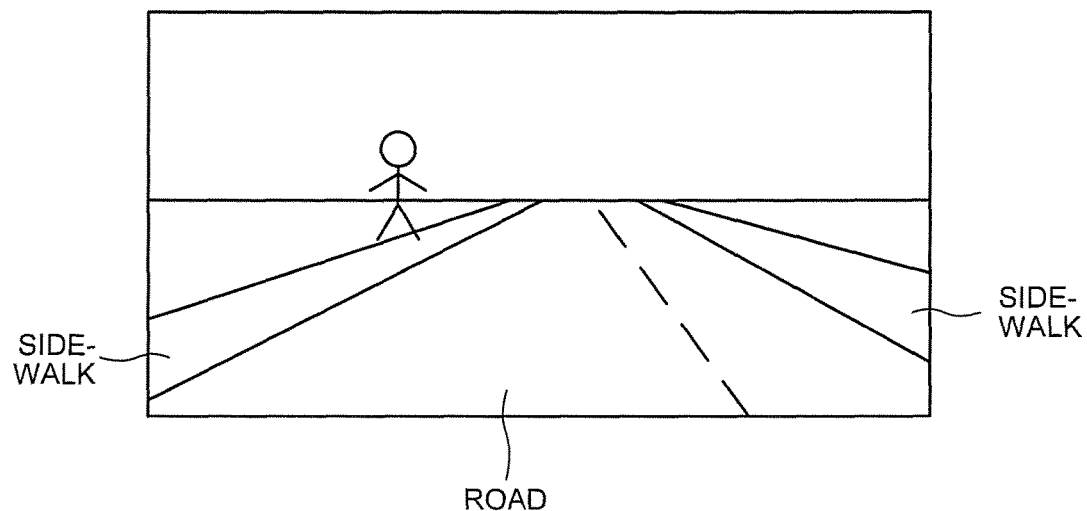
FIG. 11 is a view illustrating one example of an image of a periphery of the front side of the own vehicle.

The dangerous direction detecting unit 16a acquires an image of the periphery on the front side of the vehicle 1 including the vicinity of the course of the vehicle 1 from the camera 11. In the present explanation, the image illustrated in FIG. 11 is assumed to be acquired.

[Step S2: Detection of Dangerous Target/Direction]

Figure 12:
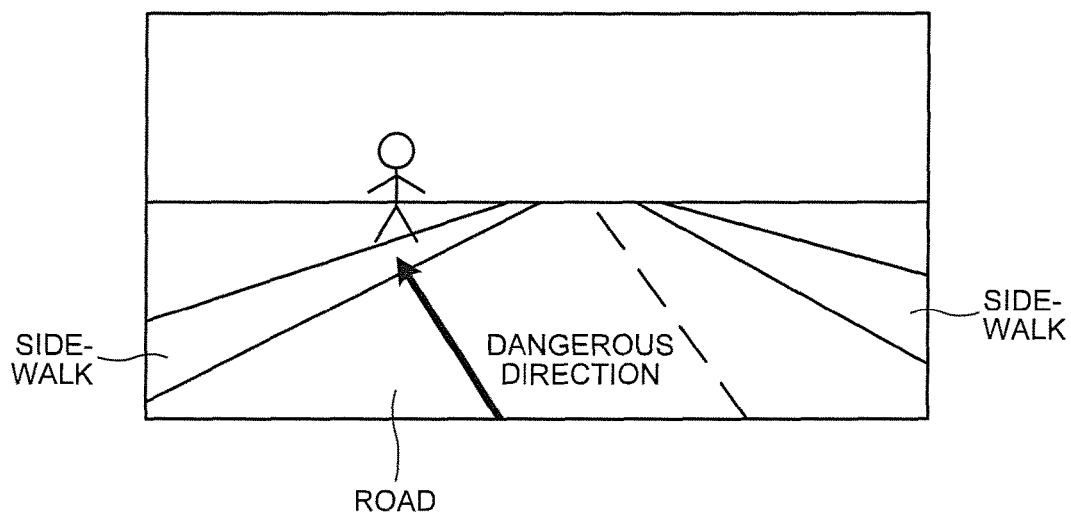
FIG. 12 is a view illustrating a detection example of a dangerous direction.

The dangerous direction detecting unit 16a detects the dangerous target and the dangerous direction from the image acquired in step S1. In the present explanation, the left side of the vehicle 1 is assumed to be detected as the dangerous direction, as illustrated in FIG. 12.

[Step S3: Determination of Performing Display]

The lighting control unit 17 confirms that the safe drive supporting device other than the display device 10 is in the normal state or in a non-defected state based on the operation status acquired by the operation status acquiring unit 16b. Assume that the normal state is confirmed in the present explanation. The drive support by the display device 10 and the drive support by another safe drive supporting device can be satisfied by the process of step S3.

[Step S4: Display of Danger Information]

The lighting control unit 17 changes the display state of the own vehicle state display FIG. 10c to the danger information display state since the dangerous direction is detected in step S2. Specifically, the lighting control unit 17 changes the display position of the own vehicle state display FIG. 10c to the display position on the left side of the display position in the initial state and the outer side of the safe, region frame 10b since the dangerous direction is detected to be on the left in step S2. Furthermore, the lighting control unit 17 changes the display area of the own vehicle state display FIG. 10c to the display area of a size greater than the display area in the initial state and to an extent of being entirely fitted without space in the safe region frame 10b. The lighting control unit 17 changes the display color of the own vehicle state display FIG. 10c from the green in the initial state to the red in the danger information display state. The driver can be notified of the effective danger avoiding behavior without the driver feeling a sense of botheration by the process of step S4.

Figure 13:
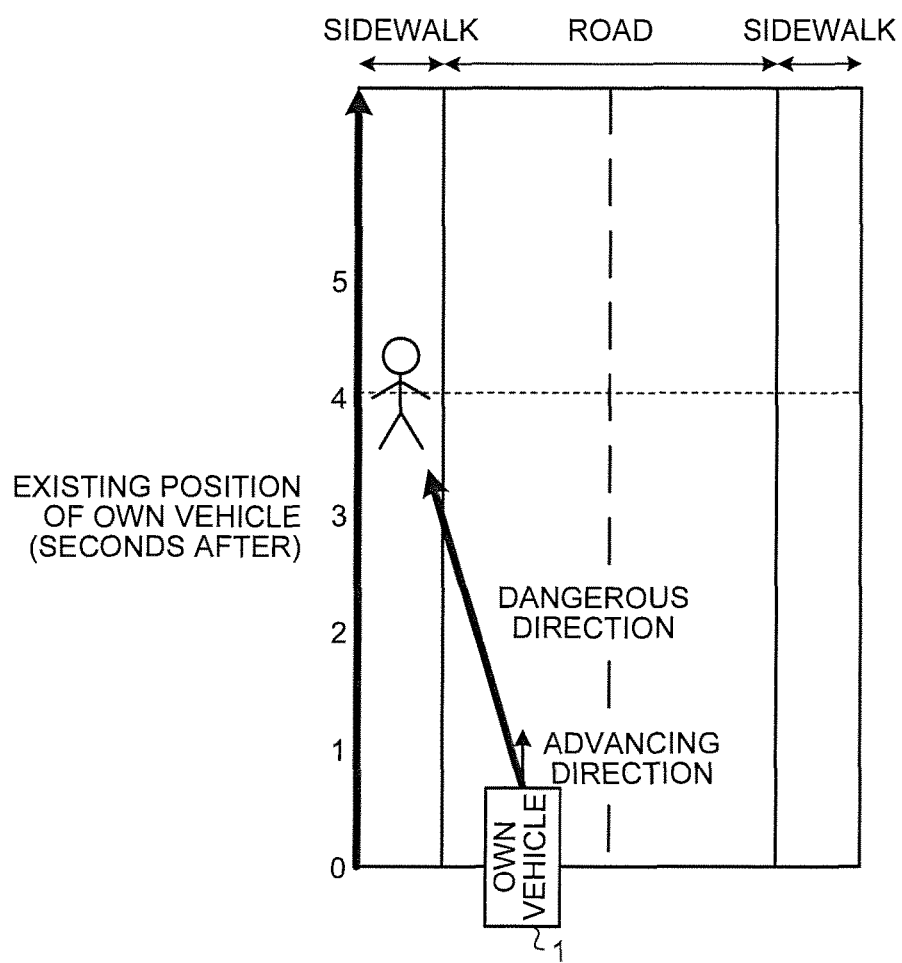
FIG. 13 is a view illustrating one example of the traffic scene.

The state of the vehicle exterior environment of the vehicle 1 at the time point the display state of the own vehicle state display FIG. 10c changed to the danger information display state is assumed to be the state illustrated in FIG. 13. Specifically, the dangerous target detected in step S2 is assumed to exist at the existing position of the vehicle 1 of four seconds after the time the display state of the own vehicle state display FIG. 10c changed to the danger information display state.

[Step S5: Emphasis of Danger Information Display]

The avoiding behavior detecting unit 16c detects whether or not the driver took the appropriate avoiding behavior with respect to the dangerous target detected in step S2 within a time range of two seconds from the time the display state of the own vehicle state display FIG. 10c changed to the danger information display state based on the detection result of the steering sensor 13, the detection result on the accelerator sensor 14, and the detection result on the brake sensor 15. In the present explanation, the appropriate avoiding behavior of the driver is assumed to have not been taken in step S5.

The lighting control unit 17 terminates the change of the display state of the own vehicle state display FIG. 10c to the danger information emphasis display state within 0.5 seconds since detection is not made by the avoiding behavior detecting unit 16c that the driver took the appropriate avoiding behavior. Specifically, the lighting control unit 17 changes (increases) the display area of the own vehicle state display FIG. 10c to the display area greater than the display area of the danger information display state. The lighting control unit 17 also changes (deforms) the display shape of the own vehicle state display FIG. 10c to an ellipse, which is a display shape different from a circle, which is the display shape of the danger information display state. The driver can be notified of the necessity of the avoiding behavior by the process of step S4.

Figure 14:
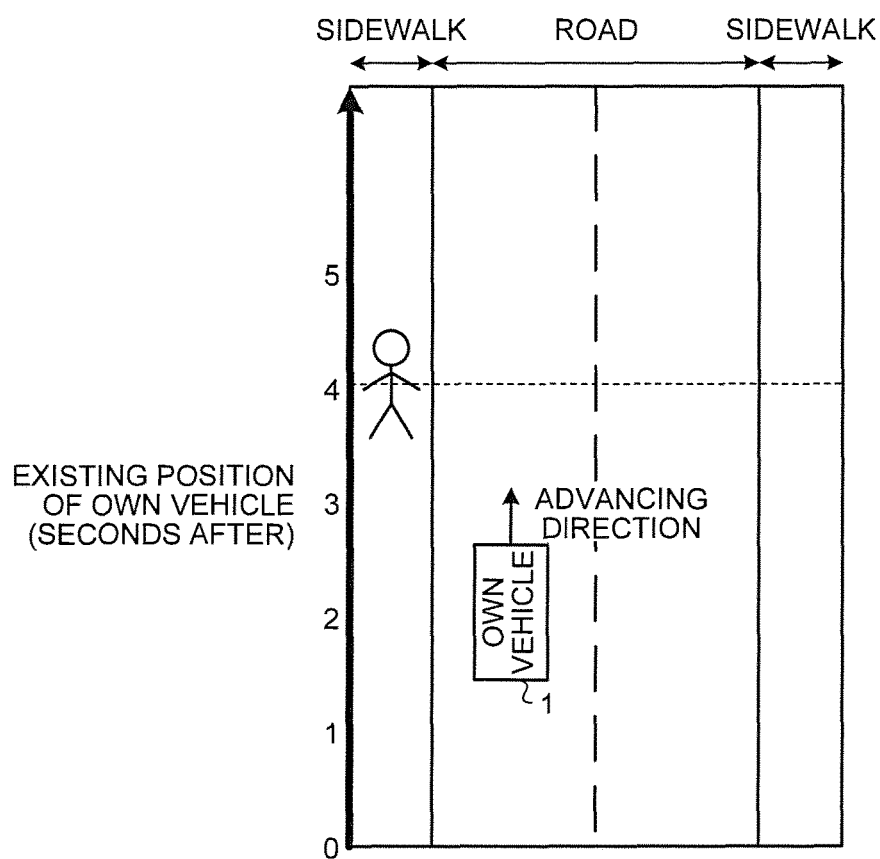
FIG. 14 is a view illustrating one example of the traffic scene.

The state of the vehicle exterior environment of the vehicle 1 at the time point the display state of the own vehicle state display FIG. 10c changed to the danger information emphasis display state is assumed to be the state illustrated in FIG. 14. Specifically, the existing position of the vehicle 1 is assumed to have moved from the existing position at the time the display state of the own vehicle state display FIG. 10c changed to the danger information display state to the existing position of two seconds after such time of change. The dangerous to get detected in step S2 is assumed to exist at the existing position of the vehicle 1 of two seconds after the time the display state of the own vehicle state display FIG. 10c changed to the danger information emphasis display state.

[Step S6: Detection of Avoiding Behavior]

The avoiding behavior detecting unit 16c detects that the driver took the appropriate avoiding behavior with respect to the dangerous target detected in step S2 based on the detection result of the steering sensor 13. Specifically, the avoiding behavior detecting unit 16c detects that the steering wheel is turned toward the right, which is opposite to the left or the dangerous direction.

Figure 15:
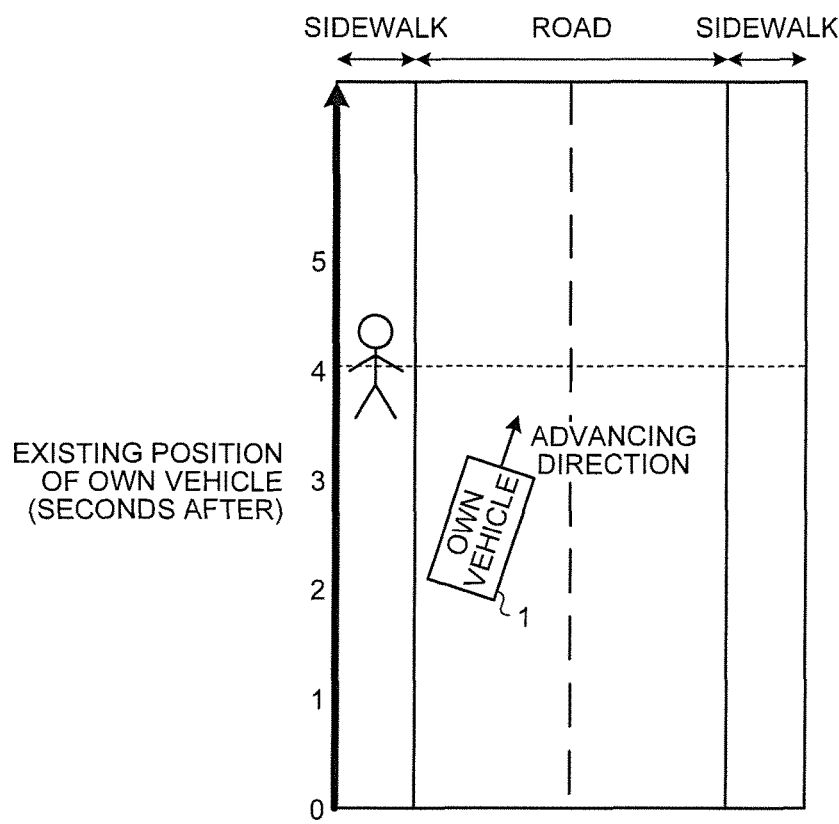
FIG. 15 is a view illustrating one example of the traffic scene.

The state of the vehicle exterior environment of the vehicle 1 at the time point the avoiding behavior detecting unit 16c detected the avoiding behavior is the state illustrated in FIG. 15. Specifically, the existing position of the vehicle 1 is assumed to have moved from the existing position at the time the display state of the own vehicle state display FIG. 10c changed to the danger information emphasis display state to the existing position of 0.5 seconds after the time of change. The dangerous target detected in step S2 is assumed to exist at the existing position of the vehicle 1 of after 1.5 seconds from the time the display state of the own vehicle state display FIG. 10c changed to the danger information emphasis display state.

[Step S7: Determination of Avoiding State]

The avoiding danger possibility detecting unit 16d detects whether or not another dangerous target different from the dangerous target (avoiding target) detected in step S2 and having the possibility of changing to be dangerous in the future exists within a forward range from the current position of the vehicle 1 to the existing position of the vehicle 1 of four seconds after the current time point based on the image obtained with the camera 11. In the present explanation, assumption is made that another dangerous target is not detected in step S7.

The lighting control unit 17 changes the display state of the own vehicle state display FIG. 10c to the best information display state since the detection is made that the driver took the appropriate avoiding behavior in step S6 and another dangerous target is not detected by the avoiding danger possibility detecting unit 16d. Specifically, the lighting control unit 17 erases the own vehicle state display FIG. 10c in the danger information emphasis display state from the display screen 10a. The lighting control unit 17 displays the red own vehicle state display FIG. 10c in the danger information display state having the display area in the initial state at the display position in the initial state. The driver can be notified that the best avoiding behavior is being performed by the process of step S7.

Figure 16:
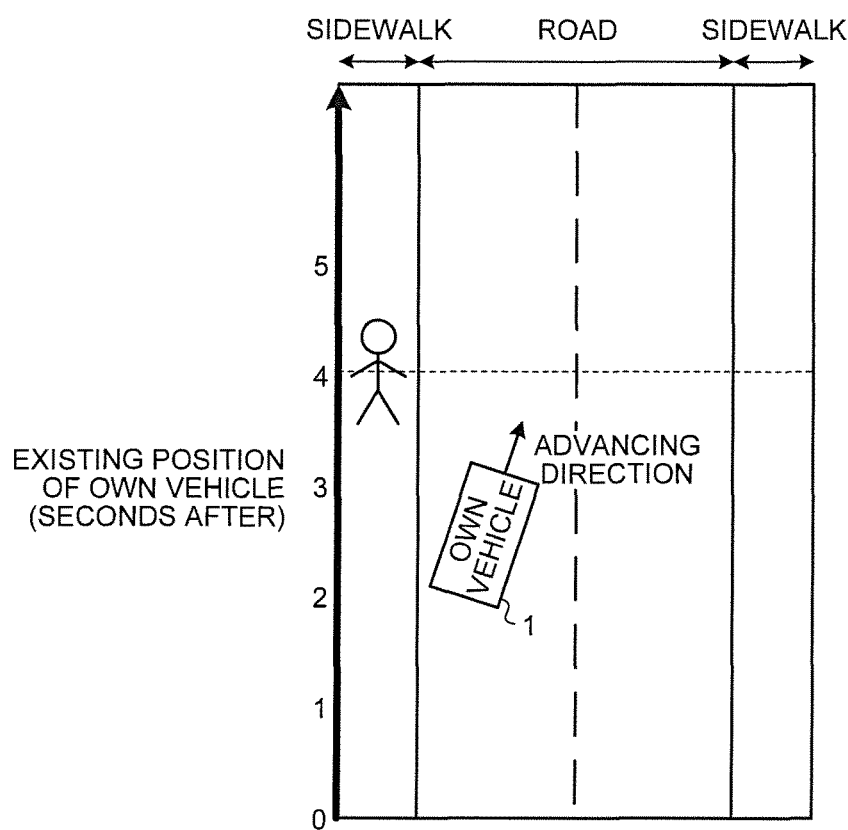
FIG. 16 is a view illustrating one example of the traffic scene.

The state of the vehicle exterior environment of the vehicle 1 at the time point the display state of the own vehicle state display FIG. 10c changed to the best information display state is assumed to be the state illustrated in FIG. 16. Specifically, the existing position of the vehicle 1 is assumed to have moved from the existing position at the time the display state of the own vehicle state display FIG. 10c changed to the danger information emphasis display state to the existing position of a little over 0.5 seconds (0.6 to 0.8 seconds) after. The dangerous target detected in step S2 is assumed to exist at the existing position of the vehicle 1 of a little less than 1.5 seconds (1.2 to 1.4 seconds) after the time the display state of the own vehicle state display FIG. 10c changed to the best information display state.

[Step S8: Control of Post-Avoidance State Display Time]

The post-avoidance danger possibility detecting unit 16e detects whether or not a dangerous target having the possibility of changing to be dangerous in the future exists in the forward range from the current position of the vehicle 1 to the existing position of the vehicle 1 of after three seconds from the current time point based on the image obtained with the camera 11. In the present explanation, assumption is made that the dangerous target is not detected in step S8.

Since the dangerous target is not detected in the post-avoidance danger possibility detecting unit 16*e*, the lighting control unit 17 sets the time point 2.5 seconds after the time the vehicle 1 passed the side of the dangerous target (avoiding target) detected in step S2 as the timing to change the display state of the own vehicle state display FIG. 10*c* to the post-avoidance information display state. The driver can be notified of the information at the time point the driver can understand by the process of step S8.

[Step S9: Display of Post-Avoidance State]

The lighting control unit 17 changes (transitions) the display state of the own vehicle state display FIG. 10*c* to the initial state corresponding the post-avoidance information display state of when the dangerous target is not detected in step S8 at the timing set in step S8. Specifically, the lighting control unit 17 changes the display color of the own vehicle state display FIG. 10*c* to green in the initial state.

Figure 17:
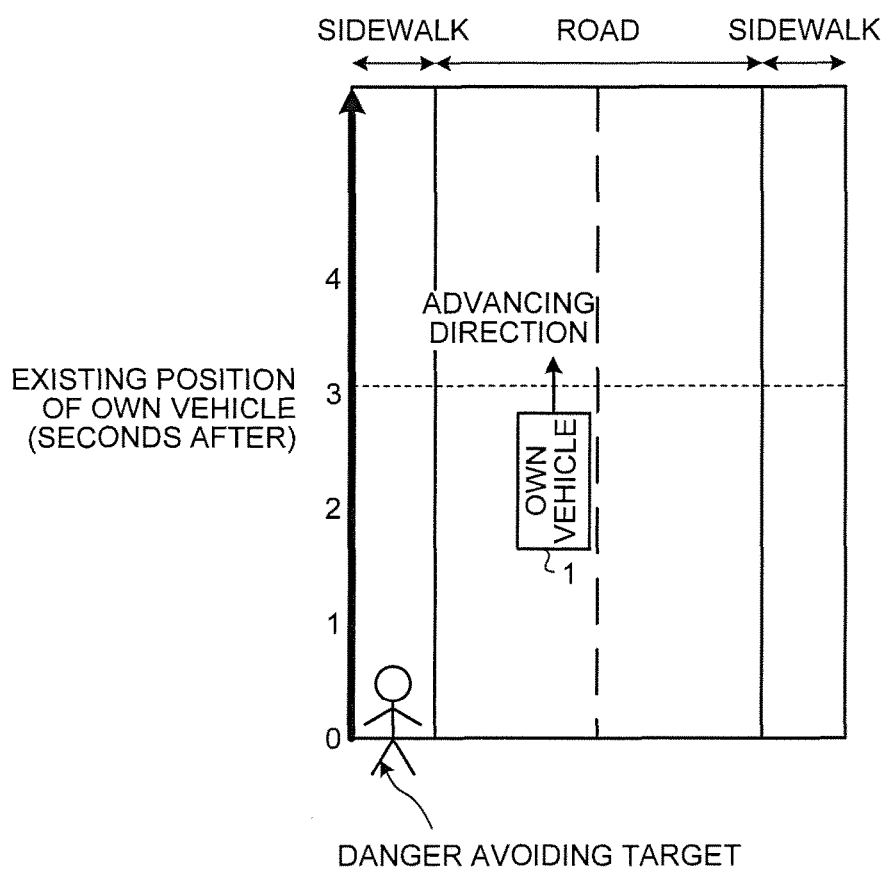
FIG. 17 is a view illustrating one example of the traffic scene.

The state of the vehicle exterior environment of the vehicle 1 at the time point the display state of the own vehicle state display FIG. 10*c* changed to the post-avoidance information display state is assumed to be the state illustrated in FIG. 17. Specifically, the existing position of the vehicle 1 is assumed to have moved from the existing position at the time the display state of the own vehicle state display FIG. 10*c* changed to the best information display state to the existing position of 2.5 seconds after passing the side of the dangerous target (avoiding target) detected in step S2.

3. Conclusion of Present Embodiment

According to the present embodiment, the lighting control unit 17 displays the safe region frame 10*b* in the vicinity of the center of the display screen 10*a* and displays the own vehicle state display FIG. 10*c* in the initial state in the vicinity of the center of the safe region frame 10*b*. The lighting control unit 17 displays the presence or absence of the dangerous target and the dangerous direction at the relative position with respect to the safe region frame 10*b* by changing the display state of the own vehicle state display FIG. 10*c* from the initial state to the danger information display state. Thus the information associated with the danger at the periphery of the own vehicle can be transmitted so as to be easily understood by the driver intuitively. The driver can be notified of the effective danger avoiding behavior without the driver feeling a sense of botheration.

According to the present embodiment, when the appropriate avoiding behavior of the driver with respect to the detected dangerous target is detected, the lighting control unit 17 changes the display position of the own vehicle state display FIG. 10*c* from the display position in the danger information display state to the display position in the initial state to display at the display position of the safe region frame 10*b* that the appropriate avoiding, behavior is taken. Thus, the drive support reflecting the intention of the driver can be provided.

According to the present embodiment, if the appropriate avoiding behavior of the driver with respect to the detected dangerous target is not detected, the lighting control unit 17 changes the display state of the own vehicle state display FIG. 10*c* from the danger information display state to the danger information emphasis display state to emphasize the display of the presence or absence of the dangerous target and the dangerous direction displayed at the current time point. Thus, the driver can be notified of the necessity of the avoiding behavior.

According to the present embodiment, if the appropriate avoiding behavior of the driver with respect to the detected dangerous target is detected, the lighting control unit 17 differentiates the display area of the own vehicle state display FIG. 10*c* to be displayed at the display position in the initial state between when another dangerous target different from the relevant dangerous target is detected and when the another dangerous target is not detected to display that the appropriate avoiding behavior is taken at the display position of the safe region frame 10*b*. Notification thus can be made that the best avoiding behavior is being performed.

INDUSTRIAL APPLICABILITY

The vehicle information transmitting device according to the present invention is useful in the automobile manufacture industry, and particularly, suited for transmitting information to the driver.

REFERENCE SIGNS LIST

10 DISPLAY DEVICE
11 CAMERA
12 VEHICLE SPEED SENSOR
13 STEERING SENSOR
14 ACCELERATOR SENSOR
15 BRAKE SENSOR
16 ECU
16*a* DANGEROUS DIRECTION DETECTING UNIT
16*b* OPERATION STATUS ACQUIRING UNIT
16*c* AVOIDING BEHAVIOR DETECTING UNIT
16*d* AVOIDING DANGER POSSIBILITY DETECTING UNIT
16*e* POST-AVOIDANCE DANGER POSSIBILITY DETECTING UNIT
17 LIGHTING CONTROL UNIT

The invention claimed is:

1. A vehicle information transmitting device comprising:
a reference mark display unit configured to display a reference mark which is a reference indicating a safe state;
a danger display unit configured to display presence or absence of danger to an own vehicle with a relative position of a figure with respect to the reference mark, and
an avoiding behavior detecting unit configured to detect presence or absence of an avoiding behavior corresponding to the danger, at the time the danger is present, wherein
the danger display unit displays a direction in which the danger is present with the relative position of the figure with respect to the reference mark, at the time danger is present,
the danger display unit displays the figure at a position of the reference mark, at the time danger is absent, and
the danger display unit displays presence of an avoiding behavior, at a time the avoiding behavior is present.

2. The vehicle information transmitting device according to claim 1, wherein
at the time danger is present, the danger display unit changes a size of a display area of the figure greater than a size thereof at the time danger is absent.

3. The vehicle information transmitting device according to claim 1, wherein the danger display unit emphasizes the display that the danger is present, at the time the avoiding behavior detecting unit detects that the avoiding behavior is absent.

4. The vehicle information transmitting device according to claim 1, wherein
the danger display unit differentiates the display that the avoiding behavior is present according to presence or absence of another danger different from the danger.

5. The vehicle information transmitting device according to claim 2, wherein
the danger display unit emphasizes the display that the danger is present, at the time the avoiding behavior detecting unit detects that the avoiding behavior is absent.

* * * * *